United States Patent [19]

Wirth

[11] Patent Number: 4,795,005
[45] Date of Patent: Jan. 3, 1989

[54] COMBINED SERVICE AND SPRING-LOADED BRAKE CYLINDER

[75] Inventor: Xaver Wirth, Ismaning, Fed. Rep. of Germany

[73] Assignee: Knorr-Bremse AG, Munich, Fed. Rep. of Germany

[21] Appl. No.: 61,610

[22] Filed: Jun. 15, 1987

[30] Foreign Application Priority Data

Jun. 13, 1986 [DE] Fed. Rep. of Germany ....... 3619948

[51] Int. Cl.$^4$ .............................................. B60T 11/10
[52] U.S. Cl. ................................ 188/153 R; 188/71.8; 188/72.3; 188/170
[58] Field of Search .................... 188/170, 72.3, 71.8, 188/71.9, 196 P, 153 R, 196 D; 303/6 C, 6 M; 192/111 A, 111 B, 91 R

[56] References Cited

U.S. PATENT DOCUMENTS

| | | | |
|---|---|---|---|
| 3,339,683 | 9/1967 | Burnett | 188/196 P |
| 3,599,761 | 8/1971 | Schultz | 188/170 |
| 3,661,230 | 5/1972 | Burnett | 188/71.9 |
| 3,762,513 | 10/1973 | Farr | 188/196 D |
| 4,014,414 | 3/1977 | Yamamoto et al. | 188/170 |
| 4,361,078 | 11/1982 | Cape et al. | 188/170 |
| 4,503,946 | 3/1985 | Davidson et al. | 188/71.9 |

FOREIGN PATENT DOCUMENTS 2739003  3/1979  Fed. Rep. of Germany ..... 188/71.9

*Primary Examiner*—Andres Kashnikow
*Assistant Examiner*—Mark T. Le
*Attorney, Agent, or Firm*—Pollock, Vande Sande & Priddy

[57] ABSTRACT

The combined service and spring-loaded brake cylinder has a service brake piston (11) and a tension piston (16) assigned to a storage spring (17). Between the tension piston, a wear stroke readjusting device with non-self-locking threading (44) is arranged. The threaded spindle (29) of the wear stroke adjusting device can be moved axially and held stationary via a conical coupling (40), which is also spring loaded in the closed direction and closes in the direction of the braking force output. There is also an annular piston (22), which can be moved into the release position by means of a second release pressure cycle at the tension piston (16) in order to move the piston. On an end section (25), which projects into free space, the tension piston (16) carries a nut (27) which can be pulled into its release position by screwing.

6 Claims, 2 Drawing Sheets

COMBINED SERVICE AND SPRING-LOADED BRAKE CYLINDER

FIELD OF THE INVENTION

The invention relates to a combined service and spring-loaded brake cylinder for vehicles, in particular for rail vehicles, having a service brake piston, which is movable while sealed in a cylinder housing, acted upon by a service brake pressure and whose output is the braking force, having a tension piston, which can be loaded by the service brake pressure and acted upon by the first release pressure and reset axially and coaxially with the service brake piston, the tension piston for compressing a storage spring, an automatic stroke readjusting device for wear, exhibiting a non-self-locking screwing, between the tension piston and the service brake piston, and a mechanical auxiliary release device, which exhibits self-locking screwing and can be actuated manually from the floor of the housing.

BACKGROUND OF THE INVENTION

Such a cylinder is known from U.S. Pat. No. 3,661,230. In this cylinder the non-self-locking threading is designed without any special free play; in the dead stroke of a coupling the rated stroke of the brake is between a screwed section and the service brake piston. Since the components are primarily staggered axially, the known cylinder is extremely long. The known cylinder already fulfills the following requirements:

The service brake is active, i.e., it can be actuated as the pressure rises, the wear of the brakes being adjusted automatically to a rated stroke.

There is an emergency or parking brake that is actuated by means of the force of a spring, in which there is no self-actuated wear readjustment.

The emergency or parking brake can be released by a release pressure.

The emergency or stopping brake can be released mechanically, whereby the release force is not guided via the wear readjusting device.

When replacing the lining, the wear readjusting device can be reset simply and mechanically.

SUMMARY OF THE INVENTION

The object of the invention is to design a combined service and spring loaded brake cylinder of the aforementioned kind such that, despite its simple construction it not only fulfills the requirements listed above but also that, with a short overall length, it offers the possibility of releasing the emergency or parking brake by means of a second release pressure if the release pressure fails, said second release pressure being independent of the first release pressure. Moreover, even when the emergency or parking brake is actuated, the stroke readjusting device for wear is to be effective at least for the successive service brakings, and with doubled rated stroke also for emergency and parking braking. And when both the service brake and the emergency or parking brake are actuated at the same time, no increase in the braking forces is to occur.

The invention achieves this object in that between the service brake piston and the tension piston, there is an annular piston, which is moved and sealed by arranged radially on the inside of the cylinder housing and radially inward on the first flanged socket of the tension piston, which can be attached to the tension piston from the front, acting counter to the loaded spring force and which separates the pressure chamber acting upon the tension piston and guiding the first release pressure toward the front against a second pressure chamber, guided by the first independent release pressure, that the tension piston is acted upon by the service brake pressure radially within the annular piston from the front, that within the annular piston-like tension piston, which penetrates radially inward with a second flanged socket the storage spring, there is a threaded spindle, which can be braced against the tension piston toward the rear via a combined stop and rotating coupling, which is spring-loaded in the closed direction, and which is screwed together with the service brake piston, by means of a non-self-locking threading, exhibiting an axial play that corresponds to a rated stroke, that the service brake piston has a third flanged socket which surrounds the threaded spindle and which extends toward the rear, and on whose outer circumference sits a friction element, which can be moved axially only against a friction force and which is braced to the rear at a stop, which is stationary in the cylinder housing, and which toward the front abuts a pre-stressed spring having a spring stroke which corresponds somewhat to the rated stroke, and encompasses the third flanged socket with clearance, wherein the force of the spring is less than the friction force, that the second flanged socket is screwed with a manually rotatable nut via the self-locking threading on a section, projecting toward the rear from the floor of the cylinder housing, the nut in a state of rest being behind the floor section at a distance corresponding at least to the rated stroke, and that the surfaces of the rearward end of the threaded spindle, the end being in the second flanged socket, are contoured such that the end can be rotated manually.

BRIEF DESCRIPTION OF THE DRAWINGS

The drawing shows an exemplary embodiment of the combined service and spring-loaded brake cylinder, designed according to the invention, in a longitudinal section (FIG. 1) and a partial view from the rear (FIG. 2).

DESCRIPTION OF PREFERRED EMBODIMENT

Figure 2:
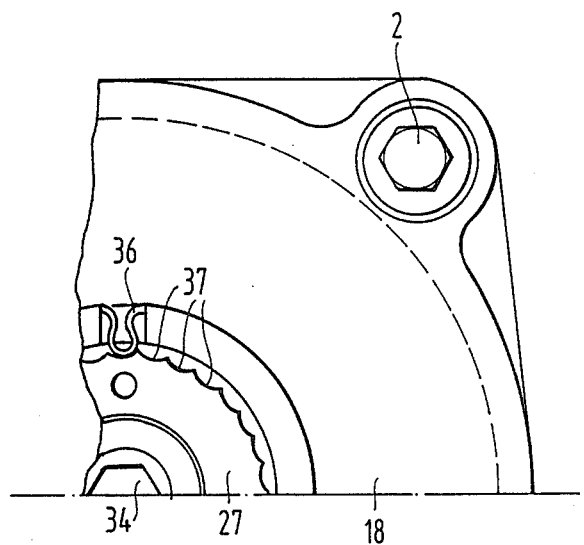

The combined service and spring-loaded brake cylinder has a multi-part cylinder housing 1, which is held together by screws 2 (FIG. 2) arranged near its outer circumference. The cylinder housing 1 has a connecting block 3, through which three pressure medium conduits 4, 5 and 6 are guided. The pressure medium conduit 4 guides a controllable service brake pressure via controllers (not shown); pressure medium conduit 5 guides the first release pressure; and pressure medium conduit 6, a second release pressure. The transition of pressure medium conduits 4, 5 and 6 from the connecting block 3 to the actual cylinder housing 1 is sealed by means of seal rings 7, 8 and 9. A service brake piston 11 is movably and sealedly arranged in the cylinder housing 1 by means of a seal ring 10. The service brake piston 11 tends to exert a braking force in the direction of arrow 12 toward the front upon braking members (not shown). The service brake piston 11 is guided relatively non-rotatably with respect to the cylinder housing by means of a sliding member guide 13. Furthermore, in the cylinder housing 1 a tension piston 16 is guided sealedly and movably by means of a radially external guide and sealing lug 14 and a seal ring 15. From the rear a tension spring 17 abuts the tension piston 16; the other end of the spring is braced against the floor section 18 of the cylinder housing 1. The tension piston 16 bears the first flanged socket 19, which extends to the front and is arranged radially within the guide and sealing lug 14; an annular piston 20 is set sealedly and movably by means of a seal ring 21 on the cylindrical outer circumference of the flanged socket 19. The annular piston 20 is somewhat Z-shaped in cross-section, its radially inward section extending to the rear and engaging with an annulus 22 between the first flanged socket 19 and the guide and sealing lug 14 of the tension piston 16. The annular piston 20, sealed and movable on the cylinder housing via a seal ring 23, is guided by means of its radially outward section, which points to the front. The pressure medium conduit 5, acted upon by the release pressure, guide through bores in the cylinder housing 1 into the space, bordered by seal rings 15, 21 and 23, between the tension piston 16 and annular piston 20, thus also into the annulus 22.

The tension piston 16 further has a second flanged socket 24, which extends to the rear, movably penetrates the tension spring 17, and with its end section 25 protrudes through an opening of the floor 18 into the open air. A nut 27 is screwed on the end section 25 by means of a self-locking threading 26; in the illustrated state of rest when tension piston 16 and unactuated mechanical auxiliary release device are in the release position, the nut 27 with a clearance 28 is behind the floor section 18, which corresponds at least to the rated stroke of the brake, enlarged by one wear stroke. Within the entire tension piston 16, designed like an annular piston, there is a threaded spindle 29 with a frontal spindle section 30, a rearward rod section 31, and an annular flange 32 at the transition between both. The rod section 32 is movably guided by means of seal rings 33 pressure-sealed and dirt-sealed in the end section 25 of the tension piston 16. On its end, the tension piston has as contoured surfaces a recess, restricted by a hexagon, by means of which the tension piston can be rotated manually by inserting a tool (not shown) together with the entire threaded spindle 29.

Between the nut 27 and the floor section 18 there is a spring locking device 36, 37, which encompasses a spring 36, shaped like a U radially inward and held at the floor section 18, and axial grooves 37, on the outer circumference of the nut 27, the spring 36 locking elastically into the axial grooves 37. The locking device 36, 37 can be moved axially by moving the engaging point of the spring 36 axially into the axial grooves 37.

In the lug region of the end section 25, the second flanged socket 24 of the tension piston 16 has a shoulder 38, facing the service brake piston 11; on said shoulder abuts a coupling piece 39, connected to the second flanged socket 24. The coupling piece 39 has a conical surface facing the service brake piston 11; the surface and a corresponding conical surface on the annular flange 32 of the threaded spindle 29 form a conical coupling 40 between the tension piston 16 and the threaded spindle 29; the coupling 40 serves as a combined stop and rotary coupling. The conical coupling 40 can be designed with gear teeth. On the side of the service brake piston, an axial bearing 41 abuts at the annular flange 32; the bearing being loaded by a spring 42, acting in the closed direction of the conical coupling 40. The front end of the spring 42 is braced at an abutment 43, arranged on the tension piston 16.

Figure 1:
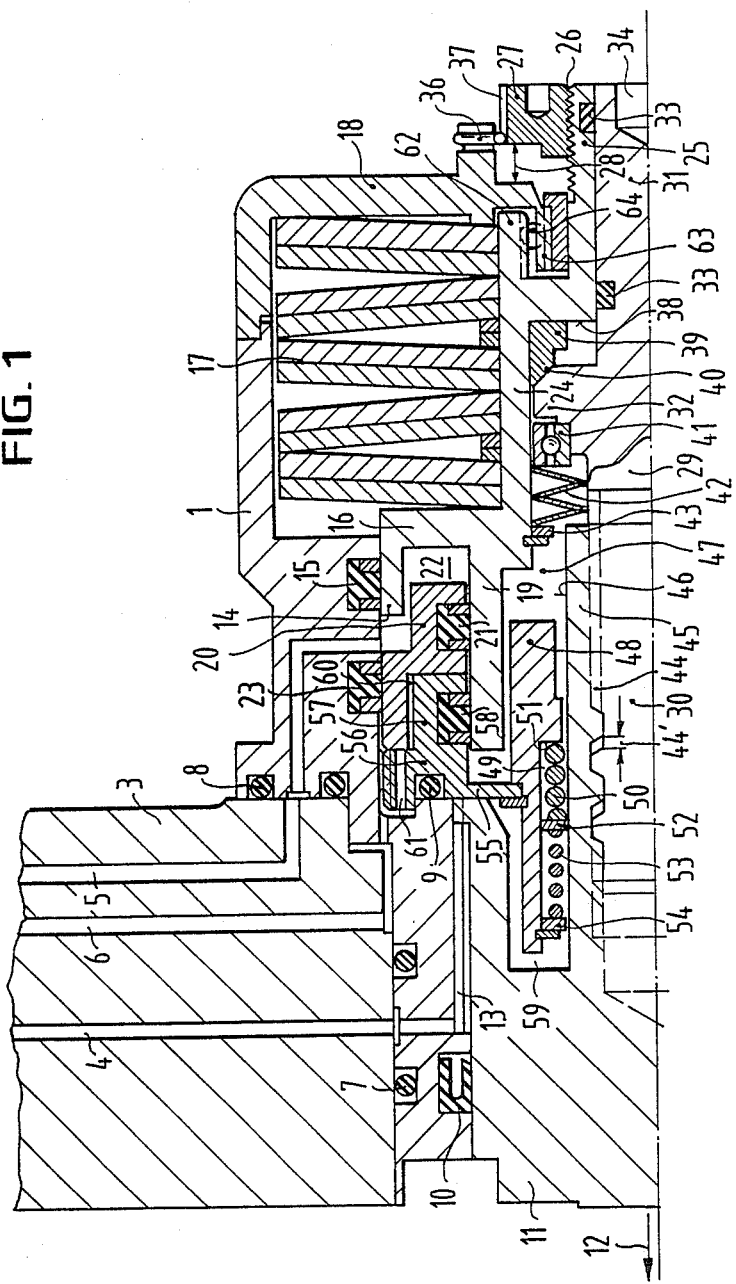

The spindle section 30 is screwed by means of a non-self-locking threading 44 with an internal threading to a third flanged socket 45, which extends in the direction of the tension piston 16 to the rear from the service brake piston 11. The threading 44 can be designed as a trapezoid thread, as shown in FIG. 1; in any event it has an axial play 44', which corresponds to the rated stroke of the brake, i.e., its release stroke plus the maximum, elastic pre-tension stroke at maximum braking tension. Between the cylindrical outer circumference 46 of the third flanged socket 45 and the first flanged socket 19 there is an annular gap 47, in which a sleeve section 48, encompassing in part the third flanged socket 45, partially engages. The sleeve section 48 has an inner annular groove 49 in which there is a spiral spring 50, which is mounted with radial pre-tension on the outer circumference 46 of the third flanged socket 45, and serves as a friction element. The spiral spring 50 tends to brace itself to the rear against the boundary of the inner annular groove 49, the border serving as stop 51. The front end of the spiral spring 50 is abutted by the rearward end of the spring 53 via a ring 52, movable within the annular groove 49; the front end of the spring 53 braces itself against the front boundary 54 of the annular groove 49. The spring 53 has a maximum spring stroke, whose size corresponds approximately to the rated stroke, thus approximately to the axial play 44'. The pre-tension of the spring 53 is less than the friction force against which the spiral spring 50 is movable on the outer circumference 46. The sleeve portion 48 is held at an annular flange 55, encompassing the sleeve portion, the flange extending from an annular intermediate portion 56 radially inward. The intermediate portion 56 is screwed into the cylinder housing 1 from the rear. The seal ring 9 is in an annular groove of the intermediate portion 56 and seals against a rearward shoulder in the cylinder housing 1, the groove opening to the front. The intermediate portion 56 and a rearward lug 57 overlap the first flanged socket 19, which is guided in the lug 57 sealed and movable by means of a seal ring 58; the radially exterior section of the annular piston 20 extends to the front and overlaps the lug 57 radially outwardly with clearance, the section interacting with the seal ring 23.

The pressure medium conduit 4, guiding the service brake pressure, terminates across axial conduits, which can also serve simultaneously for the acceptance of the sliding member guide 13, in a pressure chamber 59 for the service brake piston 11. The chamber accepts the sleeve section 48, comprises the annular gap 47, and is bordered by the seal rings 10, 9, 58 and 33. The pressure medium conduit 6, guiding the second release pressure, terminates in the screwing region of the intermediate portion 56 in a pressure chamber 60 in front of annular piston 20. In order to improve the pressure supply, the intermediate portion 56 between its outer circumference and the seal ring 9 has perforations 61, which serve at the same time for inserting screwing tools; the seal rings 9 and 58 separate the pressure chamber 60 from the pressure chamber 59 and the seal rings 21 and 23 from the annulus 22.

In its operational and release state, the service and spring storage brake cylinder assumes the position, shown in the drawing, in which the pressure chamber 59 can guide without pressure an arbitrary pressure up to the release pressure head; the annulus 22 filled with the first release pressure and the pressure chamber 60 can guide an arbitrary pressure up to the release pressure head. If there is no second release pressure in the pressure chamber 60, in any event the annular piston 20 is in its illustrated front end position, whereas when the pressure chamber 60 and annulus 22 conduct release pressure, it can assume any arbitrary position between its abutment on the intermediate portion 56 or the tension piston 16. The tension piston 16 is in its rearward end position in which the tension spring 17 is maximally compressed. The service brake piston 11 is also in its rearward position, which is defined by a totally rearward axial play 44' in the threading 44 when the conical coupling 40 is closed and when the tension piston 16 is in its rearward end position. The helical spring 50 abuts the stop 51. The conical coupling 40 is closed under the pressure of the spring 42. The nut 27 is behind the floor section 18 with clearance 28.

If, for service braking, a service brake pressure is applied to the pressure medium conduit 4 and thus the pressure chamber 59 is supplying pressure, the service brake piston 11 is moved to the left in order to apply and tension the brake, as shown in FIG. 1, the piston carrying the helical spring 50 with it by means of friction resistance and the spring 53 being compressed. With proper application and braking stroke, the service brake piston 11 travels the maximum distance of the stroke, which corresponds to the axial play 44' in the threading 44 or the maximum compression stroke of the spring 53. With the release, caused by the reduction of pressure in the pressure medium conduit 4, the service brake piston 11 returns to its illustrated initial position, via the spiral spring 50 under the force of the spring 53, which relaxes hereby, and by means of the friction resistance. During this process, the threaded spindle 29 does not experience any motion; the conical coupling 40 remains closed.

If, however, for example the brake exhibits an overstroke due to the preceding wear, the service brake piston 11 experiences an over-stroke, which exceeds the aforementioned stroke. At the start of the over-stroke the spring 53 is forced on block so that the spiral spring 50 cannot move any further to the left, but rather it is held stationary and is moved to the right under friction resistance on the third flanged socket 45, which continues to move; at the same time at the start of over-stroke, the threading 44 moves after overcoming the axial play 44' to the right side in closing shape so that the threaded spindle 29 is taken along somewhat to the left under release of the conical coupling 40. Under the force of the spring 42 the threaded spindle 29 begins to rotate in the unscrewing direction of the third flanged socket while the service brake piston 11 continues to move. Thus the spring experiences relative to the service brake piston 11 a displacement to the right up to the point when the service brake piston 11 is in idle, the conical coupling 40 relocks under the pressure of the spring 42. In this position the brake is held stationary. When the brake is released thereafter by reduction of the pressure in the pressure medium conduit 4, the service brake piston 11, as mentioned above, is moved to the right by the spring 53 and via the friction resistance of the spiral spring 50 when threaded spindle 59 stops until the threading 44 is once again on the left side and on the right side the axial play 44' has readjusted itself. With respect to its initial position, the service brake piston 11 is in a position, displaced to the left by the over-stroke; thus the over-stroke is eliminated from the brake.

In order to actuate the emergency or parking brake, the first release pressure, dominating in the pressure medium conduit 5, and, if present, also the second release pressure, dominating in pressure medium conduit 6, must be reduced to match the desired braking strength, if necessary up to at least approximately atmospheric pressure. Then the storage spring 17 can relax to the left while the tension piston 16 and, if necessary, the annular piston 20, abutting the tension piston, are moved. Thus the threaded spindle 29 is carried along via the conical coupling 40. At the same time the service brake piston 11 is also carried along via the threading 44, the piston compressing the spring 53 by means of friction resistance to the spiral spring 50. If the brake does not exhibit an over-stroke, the spring 53 is at most forced on block; however, no displacement takes place between the spiral spring 50 and the third flanged socket 45. If on the other hand, the brake exhibits an over-stroke, the stationary spiral spring 50 is moved on the third flanged socket 45, which continues to move, during the over-stroke, as described above relative to service braking.

For subsequent release, a release pressure must be built up in at least one of the pressure medium conduits 5 and 6 through which, if necessary by means of the annular piston 20, the tension piston 16 is forced back under the compression of the storage spring 17 into its illustrated rearward end position. The service brake piston 11 follows this movement under the elastic decrease in the tension of the brake and the force of the spring 53 until the spiral spring 50 once again rests at the stop 51. If there is no over-stroke at the start of braking, which is the case when the tension piston 16 ceases to move, the conical coupling 40 is not opened during the entire braking process. If, on the other hand, the brake exhibis an over-stroke at the start of braking, the tension piston 16 moves still further following the stop of the spiral spring 50 at stop 51, whereas the service brake piston 11 is held firmly to the spiral spring 50 by means of friction resistance and thus is already adjusted to the correct rated stroke. Under the force of the spring 42 with closed conical coupling 40, the threaded spindle 29 follows the further return movement of the tension piston 16, the axial play 44' in the threading 44 being eventually displaced from the right to the left side. If during this change of axial play 44', the tension piston 16 moves into its right end position, the momentary state is retained; the readjustment of the over-stroke is terminated by the next service braking. If the axial play 44' is displaced to the left, before the tension piston 16 has attained its rearward end position, following the complete displacement of the axial play 44' to the left, the threaded spindle 29 for opening the conical coupling 40 is somewhat detained as the tension piston 16 continues to move. After the conical coupling 40 has been opened, under the force of the spring 42 and unscrewing itself out of the third flanged socket 45, the threaded spindle 29 follows the further movement of the tension piston 16. When the tension piston 16 stops in its rearward end position, the conical coupling 40 relocks. With respect to the service brake piston 11, the over-stroke is complete as previously and readjusted with respect to the tension piston 16 in light of a value exceeding the rated stroke.

When both the service brake is actuated by means of an increase in pressure in the pressure chamber 59 and the emergency or stopping brake is actuated by lowering the first and, if present, the second release pressure, no increase in force of both brake actuations takes place since the service brake pressure acts to the rear on the torus of the tension piston 16 between the seal rings 58 and 33 and retains a portion of the force or the entire force of the storage spring 17; the percentage matching its head. Thus the brake not shown is not unduly strained when the service and emergency or stopping brake is actuated at the same time.

If, on release, the brake from an emergency or stopping braking, the first release pressure fails, a second release pressure must be supplied to the pressure medium conduit 6. The release pressure moves the annular piston 20 to the right to rest against the tension piston 16, whereupon the annular piston 20 and the tension piston 16 move together until they attain the rearward end position of the latter.

In all of the aforementioned braking processes, the nut 27 and the tension piston 16 move to the left at most until the still forceless abutment at the floor section 18. If there is no first or second release pressure and a release is to occur via the mechanical auxiliary release device, the nut 27 must be screwed to the left on the end section 25, the spring 36 sliding through the axial grooves 37. Thus the nut 27 comes to rest on the floor section 18, whereby it is axially braced, and then pulls the tension piston 16 under tensioning of the tension spring 17 into the rear end position. Following the return of a tension pressure, the nut 27 must be screwed back into its illustrated initial position. Thus the spring 36 and the axial groves 37 represent a rotary-locking device 36, 37, which excludes an undesired unscrewing of the nut 27.

In order to replace worn brake linings with new ones, the wear stroke readjusting device must be reset. For this purpose the threaded spindle 29 must be rotated by means of a hexagon, to be inserted into the recess 34, such that the threaded spindle 29 screws into the third flanged socket 45 and thus pulls back the service brake piston 11 while overcoming the friction force to the spring 50, held stationary at the stop 51. During this manual rotation, the conical coupling 40 ratches through, if the spring 42 exhibits pre-tension, exceeding the friction force of the spiral spring 50. The gearing, if present, of the conical coupling 40 must be tapered off at least on one side. In variance with this, if there is weak pre-tension, the spring 42 can also be compressed when resetting on block. Following resetting, the spring 42 screws the threaded spindle 29 back in order to close the conical coupling, and during subsequent service braking, the axial play 44′ also readjusts correctly.

In particular, during emergency or parking braking, during manual rotation of the threaded spindle 29 to reset the wear stroke readjusting device and while screwing the nut 27 in order to actuate the mechanical auxiliary release device, torque occurs at the tension piston 16. The torque can be transferred to the cylinder housing 1 via the tension spring 17. In order to guarantee that the tension piston 16 will also form-lock when rotating, a conventional sliding member guide 62 to 64 is provided between overlapping lugs 62 of the tension piston and 63 of the cylinder housing 1. For this purpose, vanishing axial grooves can be worked into the opposing surfaces of the lugs 62 and 63. The balls 64, bridging the annual gap between both, must be inserted in the axial groove, in the manner, indicated by the broken line.

In particular it must be stressed that since the components of the service and spring storage brake cylinder are arranged to overlap in the axial direction, the overall length of the cylinder can be very short; thus the cylinder requires little space for installation.

What is claimed is:

1. A combined service and spring-loaded brake cylinder for vehicles, in particular for rail vehicles, having a service brake piston (11) sealed and displaceable in a cylinder housing (1), acted upon by a service brake pressure and putting out braking force, having a tension piston (16), which can be loaded by the service brake pressure and acted upon by a first release pressure and reset axially and coaxially with the service brake piston, the tension piston for tensing a storage spring (17), and automatic stroke readjusting device for wear, exhibiting a non-self-locking screwing (44), between the tension piston (16) and the service brake piston (11), and a mechanical auxiliary release device, which exhibits self-locking screwing (26) and can be actuated manually from the floor (18) of the cylinder housing (1), wherein (a) between the service brake piston (11) and the tension piston (16), there is an annular piston (20) comprising a seal that is sealingly engaged with the cylinder housing (1) and with a first flanged socket (19) of the tension piston (16), which annular piston is movable by a second release pressure against the front surface of the tension piston (16) and against the spring force of the storage spring and which separates a pressure chamber (22) that includes the first release pressure acting upon the tension piston (16) and a second pressure chamber (60) that includes the second release pressure, the second release pressure is independent of the first release pressure;

(b) the tension piston (16) is acted upon from the front by the service brake pressure;

(c) a threaded spindle (29) extends radially inward with respect to a second flanged socket (24) of the tension piston and into the storage spring (17), said threaded spindle (29) being forced by a spring means (42) toward the rear of the cylinder housing and engaged with the tension piston (16) through a combined stop and rotating coupling (40), said threaded spindle screwed together with the service brake piston (11) by means of a non-self-locking threading (44), exhibiting an axial play (44′) therebetween that corresponds to a rated stroke;

(d) the service brake piston (11) has a third flanged socket (45), which encompasses the threaded spindle (29) and which extends to the rear of the cylinder housing, and on whose outer circumference (46) sits a friction element (50), which can be moved axially only against a friction force between the friction element and the third flanged socket and which is braced at its rear by a stop (51) which is stationary in the cylinder housing, and which toward the front abuts a spring (53), which is prestressed and has a spring stroke that corresponds to the rated stroke, and which spring encompasses the third flanged socket (45) with clearance wherein the force of the spring (53) is less than the friction force;

(e) the second flanged socket (24) is screwed with a manually rotatable nut (27) via the self-locking threading (26) on an end section (25) of the second flanged socket, projecting toward the rear from the floor section (18) of the cylinder housing (1), in a state of rest the nut (27) being behind the floor section (18) at a distance (28) corresponding at least to the rated stroke;

(f) the surfaces (34) of the rearward end of the threaded spindle (29) includes a shape such that the rearward end can be rotated manually; and (g) Wherein the stop (51) for the friction element (50) and a frontal support (54) for the spring (53) are on a sleeve section (48) that is located in an annular gap (47) between the first and the third flanged socket (19;45); the sleeve portion is held axially stationary on an annular flange (55) of an intermediate portion (56), which is anchored on the cylinder housing (1) between pressure chambers (59;60) that include the service brake pressure and the second release pressure, respectively, and seals the two pressure chambers; the annular flange extending radially inwardly.

2. A service and spring-loaded brake cylinder according to claim 1, wherein the service brake piston (11) and the tension piston (16) is guided non-rotatable and axially displaceably on the cylinder housing (1) by means of form-lock.

3. A service and spring-loaded brake cylinder according to claim 1, wherein the friction element is a radially pre-stressed spiral spring (50) seated on the third flanged socket (45).

4. A service and spring-loaded brake cylinder according to claim 1, wherein the intermediate portion (56) is threadably engaged with the cylinder housing (1), which intermediate portion (56) includes on its front side a seal ring (9) that is in contact with the cylinder housing (1), and on its back side a lug (57), which lug (57) overlaps the first flanged socket (19) and includes a seal ring (58) therebetween.

5. A service and spring-loaded brake cylinder according to claim 1, wherein a resiliently releasable, axially movable rotary locking device (36, 37) is arranged between the cylinder housing (1) and the nut (27).

6. A service and spring-loaded brake cylinder according to claim 1, wherein the stop and rotary coupling is a toothed conical coupling (40), the coupling includes an annular member (32) located at the transition point between a frontal spindle section (30) and a rearward rod section (31) of the threaded spindle (29); wherein between the annular member (32) and an inner flange (43) of the tension piston (16), a spring (42) and an axial bearing (41) is included; the annular member is positioned rearwardly of the inner flange; wherein the rod section (31) is guided via at least a seal ring (33) sealed and movable in the second flanged socket (24).

* * * * *